United States Patent
Apuri et al.

(10) Patent No.: US 12,282,463 B2
(45) Date of Patent: Apr. 22, 2025

(54) INLINE DATA QUALITY SCHEMA MANAGEMENT SYSTEM

(71) Applicant: Bank of America Corporation, Charlotte, NC (US)

(72) Inventors: Vivekanand Apuri, Hyderabad (IN); Naresh Dolani, Mumbai (IN); Sasi Reka Velliangiri, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 18/198,144

(22) Filed: May 16, 2023

(65) Prior Publication Data

US 2024/0386000 A1    Nov. 21, 2024

(51) Int. Cl.
*G06F 16/215*    (2019.01)
*G06F 16/22*    (2019.01)

(52) U.S. Cl.
CPC ............ *G06F 16/215* (2019.01); *G06F 16/22* (2019.01)

(58) Field of Classification Search
CPC ................................ G06F 16/215; G06F 16/22
See application file for complete search history.

(56) References Cited

U.S. PATENT DOCUMENTS

| | | | |
|---|---|---|---|
| 5,842,202 A | 11/1998 | Kon | |
| 8,401,987 B2 | 3/2013 | Agrawal et al. | |
| 9,836,713 B2 | 12/2017 | Bagchi et al. | |
| 10,318,500 B2 | 6/2019 | Dani et al. | |
| 11,327,935 B2 | 5/2022 | Yamashita et al. | |
| 2005/0108631 A1 | 5/2005 | Amorin et al. | |
| 2006/0212381 A1* | 9/2006 | Rowe, III | G06Q 40/04 705/37 |
| 2008/0082834 A1* | 4/2008 | Mattsson | G06F 12/1408 715/765 |
| 2012/0330911 A1 | 12/2012 | Gruenheid et al. | |
| 2016/0004742 A1 | 1/2016 | Mohan et al. | |
| 2018/0039680 A1 | 2/2018 | Nelke et al. | |
| 2018/0089561 A1* | 3/2018 | Oliner | G06F 16/2471 715/765 |
| 2018/0373579 A1 | 12/2018 | Rathore et al. | |
| 2019/0205636 A1* | 7/2019 | Saraswat | G06V 30/412 715/765 |
| 2020/0082279 A1* | 3/2020 | Arora | G06N 3/045 715/765 |
| 2021/0081476 A1* | 3/2021 | Weinstein | G06Q 10/1053 715/765 |
| 2023/0135962 A1* | 5/2023 | Lee | G06F 40/216 704/9 |

* cited by examiner

*Primary Examiner* — Yuk Ting Choi
(74) *Attorney, Agent, or Firm* — Banner & Witcoff, Ltd.

(57) ABSTRACT

Various aspects of the disclosure relate to automatically inferring data quality rules for relational and/or non-SQL datasets. The data quality rules may be added as additional metadata for a data schema to improve and add validations for data to ensure data consistency and/or to identify invalid data. Rules may be automatically inferred based on data of data elements in one or more datasets and an identified significance of data in data points to extract common characteristics of data to create, teach and train one or more data quality (DQ) models for data elements across all data stores of the enterprise network.

20 Claims, 5 Drawing Sheets

INLINE DATA QUALITY SCHEMA MANAGEMENT SYSTEM

BACKGROUND

Large organizations, such as financial institutions and other large enterprise organizations, may provide many different products and/or services. To support these complex and large-scale operations, a large organization may own, operate, and/or maintain many different computer systems that service different internal users and/or external users in connection with different products and services. In addition, some computer systems internal to the organization may be configured to exchange information with computer systems external to the organization to provide and/or support different products and services offered by the organization.

As a result of the complexity associated with the operations of a large organization and its computer systems, it may be difficult for such an organization, such as a financial institution, to manage its computer systems efficiently, effectively, securely, and uniformly, and particularly manage how internal computer systems exchange information with external computer systems in providing and/or supporting different products and services offered by the organization. As such enterprise organizations must manage large amounts of information, which may be stored in multiple databases. Often, based on the nature, age, technology base of applications consuming and/or producing data, enterprise organizations may utilize multiple databases based on different technologies. Data schemas may be used, for example, with relational databases, non-Structured Query Language (e.g., a noSQL) databases, and the like, to define an organizational structure of a particular database. For example, a data schema for an illustrative database (e.g., a relational database, and the like) may be used to define logical constraints such as data fields, and/or methods of validation of data for each data field. In some cases, these validation methods may be coined into a data definition language, a data meta language or the like that defines a structure of for data stored in the database. Most of the validation techniques used when defining schemas may be standardized and often are not customized to the needs of different business units based on a domain of data use. As such, customized validation techniques based on business rules are difficult to define across the enterprise network due to disparate data storage types, schemas, and usage requirements and cannot be easily standardized for the different database technologies.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary presents some concepts of the disclosure in a simplified form as a prelude to the description below.

Aspects of the disclosure relate to computer systems that provide effective, efficient, scalable, and convenient ways of securely and uniformly managing how internal computer systems exchange information with external computer systems to provide and/or support different products and services offered by an organization (e.g., a financial institution, and the like).

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes extending a data schema over a data fabric to create data pipelines to continuously and intelligently identify data quality rules through each data pipeline.

Aspects of the disclosure relate to computer hardware and software. In particular, one or more aspects of the disclosure generally relate to computer hardware and software for managing and generating data quality schema rules.

Based on identified problems with effectively managing data quality rules for schemas across disparate database technologies, a need has been recognized to automatically infer data quality rules for relational and/or non-SQL datasets. These Data Quality rules may be added as additional metadata for a data schema for particular relational database management system and/or non-SQL databases to improve and add validations for data to ensure data consistency and/or to identify invalid data. Rules may be automatically inferred based on data of data elements in one or more datasets and an identified significance of data in data points to extract common characteristics of data to create, teach and train one or more data quality (DQ) models for data elements across all data stores of the enterprise network.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As used throughout this disclosure, computer-executable "software and data" can include one or more: algorithms, applications, application program interfaces (APIs), attachments, big data, daemons, emails, encryptions, databases, datasets, drivers, data structures, file systems or distributed file systems, firmware, graphical user interfaces, images, instructions, machine learning (e.g., supervised, semi-supervised, reinforcement, and unsupervised), middleware, modules, objects, operating systems, processes, protocols, programs, scripts, tools, and utilities. The computer-executable software and data is on tangible, computer-readable memory (local, in network-attached storage, or remote), can be stored in volatile or non-volatile memory, and can operate autonomously, on-demand, on a schedule, and/or spontaneously.

"Computer machines" can include one or more: general-purpose or special-purpose network-accessible administrative computers, clusters, computing devices, computing platforms, desktop computers, distributed systems, enterprise computers, laptop or notebook computers, primary node computers, nodes, personal computers, portable electronic devices, servers, node computers, smart devices, tablets, and/or workstations, which have one or more microprocessors or executors for executing or accessing the computer-executable software and data. References to computer machines and names of devices within this definition are used interchangeably in this specification and are not considered limiting or exclusive to only a specific type of device. Instead, references in this disclosure to computer machines and the like are to be interpreted broadly as understood by skilled artisans. Further, as used in this specification, computer machines also include all hardware and components typically contained therein such as, for example, processors, executors, cores, volatile and non-volatile memories, communication interfaces, etc.

Computer "networks" can include one or more local area networks (LANs), wide area networks (WANs), the Internet, wireless networks, digital subscriber line (DSL) networks, frame relay networks, asynchronous transfer mode (ATM) networks, virtual private networks (VPN), or any combination of the same. Networks also include associated "network equipment" such as access points, ethernet adaptors (physical and wireless), firewalls, hubs, modems, routers, and/or switches located inside the network and/or on its periphery, and software executing on the foregoing.

The above-described examples and arrangements are merely some examples of arrangements in which the systems described herein may be used. Various other arrangements employing aspects described herein may be used without departing from the innovative concepts described.

Based on identified problems with effectively managing data quality rules for schemas across disparate database technologies, a need has been recognized to automatically infer data quality rules for relational and/or noSQL datasets. These Data Quality rules may be added as additional metadata for a data schema for particular relational database management system and/or noSQL databases to improve and add validations for data to ensure data consistency and/or to identify invalid data. Rules may be automatically inferred based on data of data elements in one or more datasets and an identified significance of data in data points to extract common characteristics of data to create, teach and train one or more data quality (DQ) models for data elements across all data stores of the enterprise network.

An illustrative inline data quality schema management system utilizes a data fabric for extending data schema metadata by intelligently inferring data quality rules on data input to a plurality of enterprise datasets. For example, each of the enterprise datasets may be associated with one or more applications, products or services provided via the enterprise network. The data fabric will be integrated with artificial intelligence (AI)-enabled algorithms (e.g., via a machine learning (ML) engine, deep learning algorithms, neural networks, and the like) to create data pipelines by continuously identifying data quality rules for data received via input pipelines. An AI/ML algorithm may be based on a cognitive solution to discover unique, business-relevant relationships between the available data points and generate data quality (DQ) metadata models on data points. DQ metadata models is based on a proprietary format that can be utilized across the enterprise network, such as in databases, applications, reports, extract, transform, and load (ETL) processes and the like, as additional validations to ensure data integrity and accuracy. These models can be embedded with data to enrich accuracy and correctness of data as it is received by the enterprise network and/or ingested by relevant data repositories.

Figure 1A:
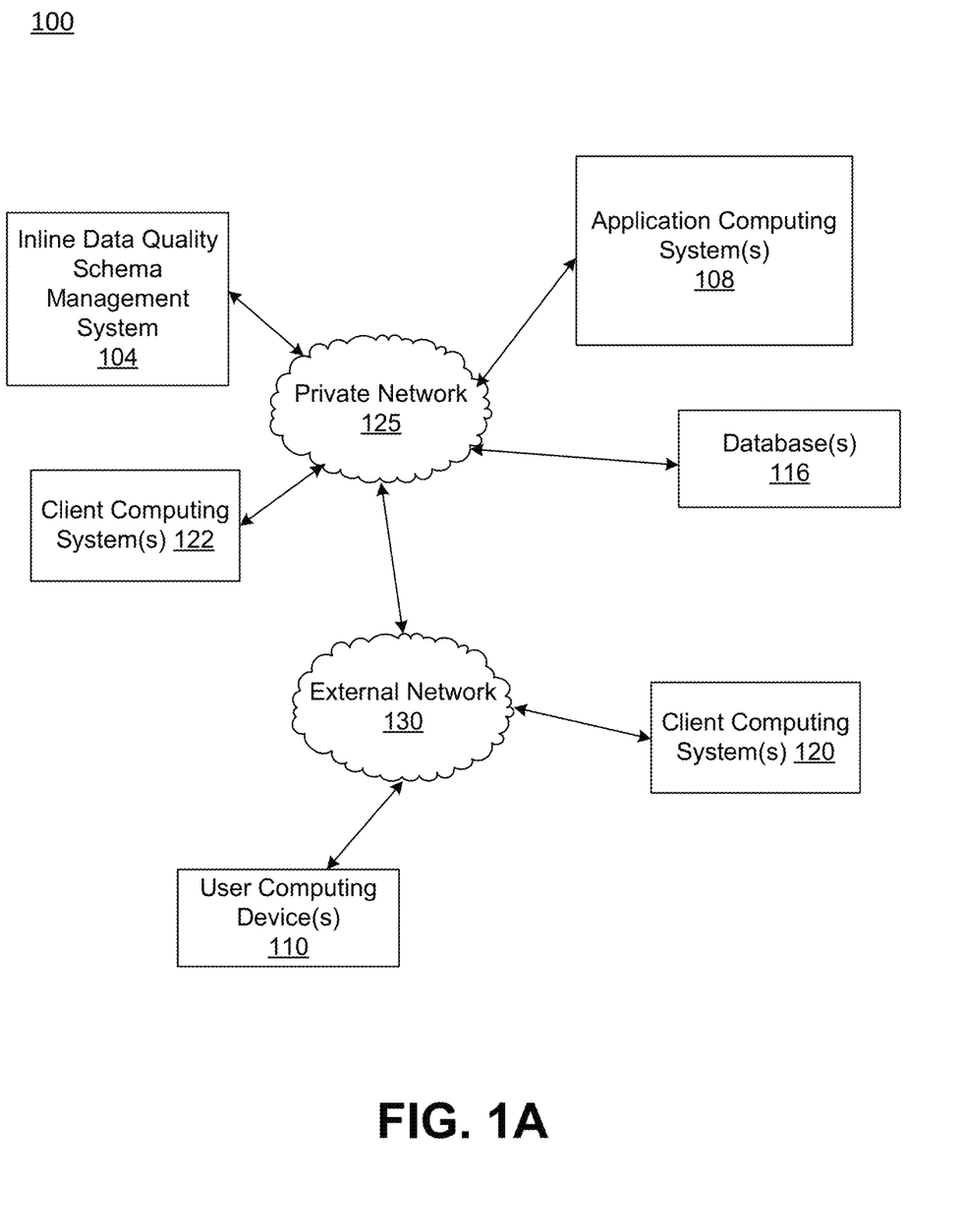
FIG. 1A shows an illustrative computing environment for inline data schema management, in accordance with one or more aspects described herein.

By using AI/ML, the inline data quality schema management system builds an algorithm which can learn and extract DQ metadata rules from different datasets by identifying relevance, relations, data domain of data fields and identifying different patterns of data to generate proprietary and standardized DQ data models. By integrating the built algorithm with a data fabric, the inline data quality schema management system creates a data schema pipeline for intelligent building, training, and evolution of DQ data models FIG. 1A shows an illustrative computing environment 100 for inline data schema management, in accordance with one or more arrangements. The computing environment 100 may comprise one or more devices (e.g., computer systems, communication devices, and the like). The computing environment 100 may comprise, for example, an inline data quality schema management system 104, one or more application computing systems 108, one or more client computing systems 122 and/or one or more data repositories or file storage systems (e.g., database(s) 116). The one or more of the devices and/or systems, may be linked over a private network 125 associated with an enterprise organization (e.g., a financial institution, a business organization, an educational institution, a governmental organization and the like). The computing environment 100 may additionally comprise at least one client computing system 120 and one or more user devices 110 connected, via a public network 130, to the devices in the private network 125, such as client external systems that may access aspects of one or more hosted solutions. The devices in the computing environment 100 may transmit/exchange/share information via hardware and/or software interfaces using one or more communication protocols. The communication protocols may be any wired communication protocol(s), wireless communication protocol(s), one or more protocols corresponding to one or more layers in the Open Systems Interconnection (OSI) model (e.g., local area network (LAN) protocol, an Institution of Electrical and Electronics Engineers (IEEE) 802.11 WIFI protocol, a $3^{rd}$ Generation Partnership Project (3GPP) cellular protocol, a hypertext transfer protocol (HTTP), Simple Mail Transfer (SMTP), File transfer (FTP), Secure Hypertext transfer (HTTPs etc.).

The inline data quality schema management system 104 may comprise one or more computing devices and/or other computer components (e.g., processors, memories, communication interfaces) configured to perform one or more functions as described herein. Further details associated with the architecture of the inline data quality schema management are described with reference to FIG. 1B.

The application computing systems 108 and/or the client computing systems 122 may comprise one or more computing devices and/or other computer components (e.g., processors, memories, communication interfaces, instructions such as firmware and/or software stored accessible in memory devices, and the like). In addition, the application computing systems 108 and/or the client computing systems 122 may be configured to host, execute, and/or otherwise provide one or more enterprise applications. In some cases, the application computing systems 108 may host one or more services configured facilitate operations requested through one or more API calls, such as data retrieval and/or initiating processing of specified functionality. In some cases, the client computing systems 122 may be configured to communicate with one or more of the application computing systems 108 such as via direct communications and/or API function calls and the services and/or the one or more application computing systems 108 may be configured to communicate with the client computing systems 122. In an arrangement where the private network 125 is associated with a financial institution (e.g., a bank), the application computing systems 108 may be configured, for example, to host, execute, and/or otherwise provide one or more transaction processing programs, such as an online banking application, fund transfer applications, client onboarding applications, trading applications, reporting applications, and/or other programs associated with the financial institution. The client computing system 122 and/or the application computing systems 108 may comprise various servers and/or databases that store and/or otherwise maintain account information, such as financial account information including account balances, transaction history, account owner information, client details, client agreements, and/or other information. In addition, the client computing system 122 and/or the application computing systems 108 may process and/or otherwise execute transactions on specific accounts based on commands and/or other information received from other computer systems comprising the computing environment 100. In some cases, one or more of the client computing system 122 and/or the application computing systems 108 may be configured, for example, to host, execute, and/or otherwise provide one or more transaction processing programs, such as electronic fund transfer applications, online loan processing applications, and/or other programs associated with the financial institution. In some cases, the client computing systems 122 may use DQ rules received from the inline data quality schema management system 104 to validate data accuracy for processing day to day operations such as generating transactions, validating transactions, generating reports, and the like.

The application computing systems 108 may be one or more host devices (e.g., a workstation, a server, and the like) or mobile computing devices (e.g., smartphone, tablet). In addition, an application computing systems 108 may be linked to and/or operated by a specific enterprise user (who may, for example, be an employee or other affiliate of the enterprise organization) who may have administrative privileges to perform various operations within the private network 125. In some cases, the application computing systems 108 may be capable of performing one or more layers of user identification based on one or more different user verification technologies including, but not limited to, password protection, pass phrase identification, biometric identification, voice recognition, facial recognition and/or the like. In some cases, a first level of user identification may be used, for example, for logging into an application or a web server and a second level of user identification may be used to enable certain activities and/or activate certain access rights.

The client computing system 120 may comprise one or more computing devices and/or other computer components (e.g., processors, memories, communication interfaces). The client computing system 120 may be configured, for example, to host, execute, and/or otherwise provide one or more transaction processing programs, such as goods ordering applications, electronic fund transfer applications, online loan processing applications, and/or other programs associated with providing a product or service to a user. With reference to the example where the client computing system 120 is for processing an electronic exchange of goods and/or services. The client computing system 120 may be associated with a specific goods purchasing activity, such as purchasing a vehicle, transferring title of real estate may perform communicate with one or more other platforms within the client computing system 120. In some cases, the client computing system 120 may integrate API calls to request data, initiate functionality, or otherwise communicate with the one or more application computing systems 108, such as via the services. For example, the services may be configured to facilitate data communications (e.g., data gathering functions, data writing functions, and the like) between the client computing system 120 and the one or more application computing systems 108.

The user device(s) 110 may be computing devices (e.g., desktop computers, laptop computers) or mobile computing device (e.g., smartphones, tablets) connected to the network 125. The user device(s) 110 may be configured to enable the user to access the various functionalities provided by the devices, applications, and/or systems in the network 125.

The database(s) 116 may comprise one or more computer-readable memories storing information that may be used by inline data quality schema management system 104. For example, the database(s) 116 may store, raw input data, application datasets, data confidence information, DQ data models, usability reports, and the like. In an arrangement, the database(s) 116 may be used for other purposes as described herein. In some cases, the client computing system 120 may write data or read data to the database(s) 116 via the services.

In one or more arrangements, the inline data quality schema management system 104, one or more application computing systems 108, one or more client computing systems 122, the client computing system 120, the user devices 110, and/or the other devices/systems in the computing environment 100 may be any type of computing device capable of receiving input via a user interface, and communicating the received input to one or more other computing devices in the computing environment 100. For example, the inline data quality schema management system 104, one or more application computing systems 108, one or more client computing systems 122, the client computing system 120, the user devices 110, and/or the other devices/systems in the computing environment 100 may, in some instances, be and/or include server computers, desktop computers, laptop computers, tablet computers, smart phones, wearable devices, or the like that may comprised of one or more processors, memories, communication interfaces, storage devices, and/or other components. Any and/or all of the inline data quality schema management system 104, one or more application computing systems 108, one or more client computing systems 122, the client computing system 120, the user devices 110, and/or the other devices/systems in the computing environment 100 may, in some instances, be and/or comprise special-purpose computing devices configured to perform specific functions.

Figure 1B:
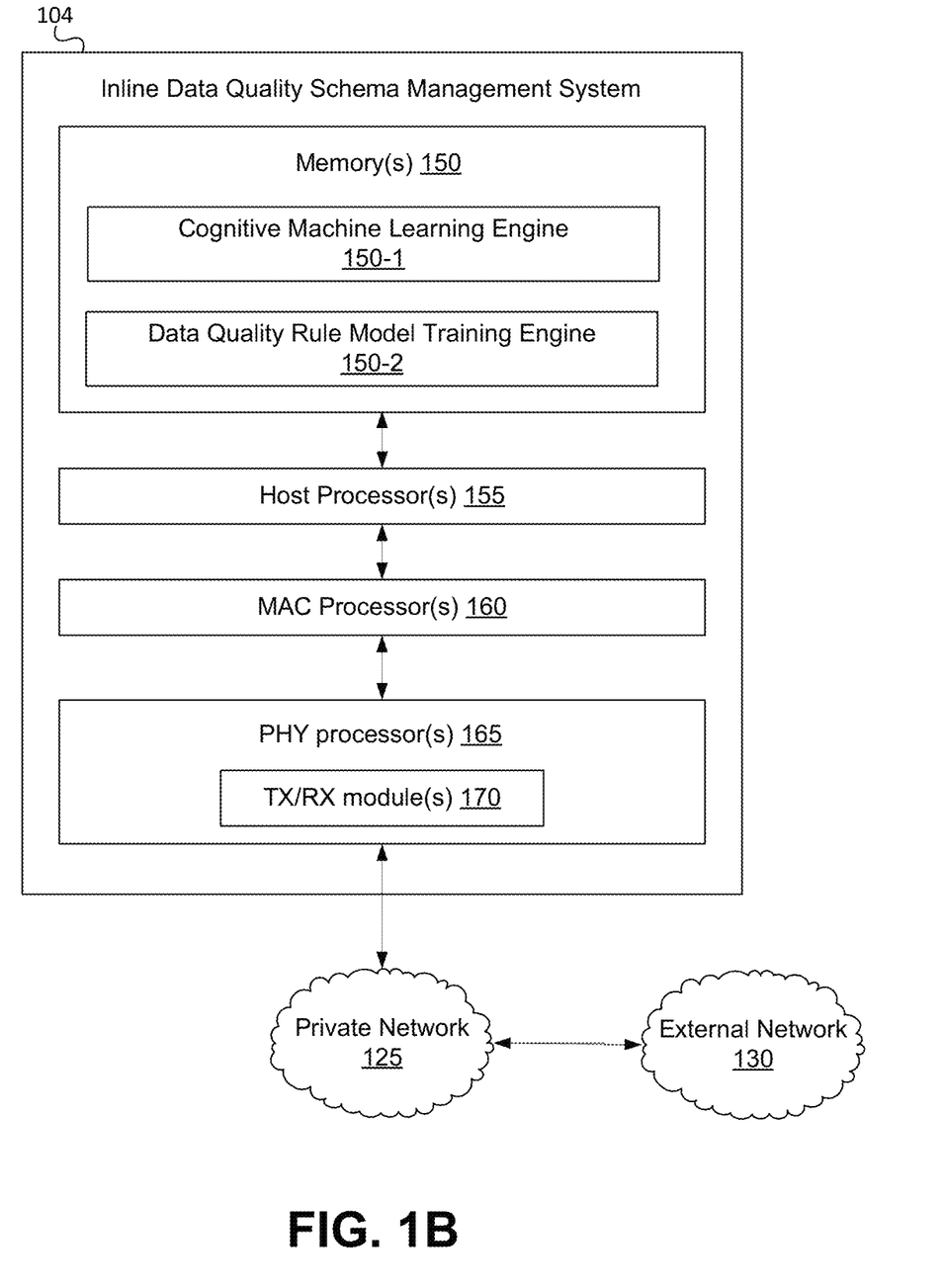
FIG. 1B shows an illustrative computing platform enabled for inline data schema management, in accordance with one or more aspects described herein.

FIG. 1B shows an illustrative inline data quality schema management system 104 in accordance with one or more examples described herein. The illustrative inline data quality schema management system 104 may be a stand-alone device and/or may at least be partial integrated with another computing system and may comprise one or more of host processor(s) 155, medium access control (MAC) processor(s) 160, physical layer (PHY) processor(s) 165, transmit/receive (TX/RX) module(s) 170, memory 150, and/or the like. One or more data buses may interconnect host processor(s) 155, MAC processor(s) 160, PHY processor(s) 165, and/or Tx/Rx module(s) 170, and/or memory 150. The illustrative inline data quality schema management system 104 may be implemented using one or more integrated circuits (ICs), software, or a combination thereof, configured to operate as discussed below. The host processor(s) 155, the MAC processor(s) 160, and the PHY processor(s) 165 may be implemented, at least partially, on a single IC or multiple ICs. The memory 150 may be any memory such as a random-access memory (RAM), a read-only memory (ROM), a flash memory, or any other electronically readable memory, or the like. In some cases, inline data quality schema management system 104 may comprise components (such as those discussed above) that may be distributed across multiple computing devices such as to enable operation of different computing engines such as a cognitive machine learning model, systems used in different stages of data fabric pipelines, systems to store one or more data quality models, and/or the like.

Messages transmitted from and received at devices in the computing environment 100 may be encoded in one or more MAC data units and/or PHY data units. The MAC processor(s) 160 and/or the PHY processor(s) 165 of the illustrative inline data quality schema management system 104 may be configured to generate data units, and process received data units, that conform to any suitable wired and/or wireless communication protocol. For example, the MAC processor(s) 160 may be configured to implement MAC layer functions, and the PHY processor(s) 165 may be configured to implement PHY layer functions corresponding to the communication protocol. The MAC processor(s) 160 may, for example, generate MAC data units (e.g., MAC protocol data units (MPDUs)), and forward the MAC data units to the PHY processor(s) 165. The PHY processor(s) 165 may, for example, generate PHY data units (e.g., PHY protocol data units (PPDUs)) based on the MAC data units. The generated PHY data units may be transmitted via the TX/RX module(s) 170 over the private network 155. Similarly, the PHY processor(s) 165 may receive PHY data units from the TX/RX module(s) 165, extract MAC data units encapsulated within the PHY data units, and forward the extracted MAC data units to the MAC processor(s). The MAC processor(s) 160 may then process the MAC data units as forwarded by the PHY processor(s) 165.

One or more processors (e.g., the host processor(s) 155, the MAC processor(s) 160, the PHY processor(s) 165, and/or the like) of the illustrative inline data quality schema management system 104 may be configured to execute machine readable instructions stored in memory 150. The memory 150 may comprise (i) one or more program modules/engines having instructions that when executed by the one or more processors cause the illustrative inline data quality schema management system 104 to perform one or more functions described herein and/or (ii) one or more databases that may store and/or otherwise maintain information which may be used by the one or more program modules/engines and/or the one or more processors. The one or more program modules/engines and/or databases may be stored by and/or maintained in different memory units of the illustrative inline data quality schema management system 104 and/or by different computing devices that may form and/or otherwise make up the illustrative inline data quality schema management system 104. For example, the memory 150 may have, store, and/or comprise a cognitive machine learning engine 150-1, a data quality rule model training engine 150-2, and/or the like. The cognitive machine learning engine 150-1 may have instructions that direct and/or cause the inline data quality schema management system 104 to perform one or more operations associated with identifying DQ metadata rules from different datasets by identifying relevance, relations, data domain of data fields and identifying different patterns of data, and the like. The data quality rule model training engine 150-2 may have instructions that may cause the inline data quality schema management system 104 to perform train one or more DQ models to identify different data quality rules for each data element from each particular dataset.

While FIG. 1A illustrates the inline data quality schema management system 104 and the application computing systems 108, as being separate elements connected in the private network 125, in one or more other arrangements, functions of one or more of the above may be integrated in a single device/network of devices that each may process a portion of the instructions to perform the functionality discussed herein. For example, elements in the inline data quality schema management system 104 (e.g., host processor(s) 155, memory(s) 150, MAC processor(s) 160, PHY processor(s) 165, TX/RX module(s) 170, and/or one or more program/modules stored in memory(s) 150) may share hardware and software elements with and corresponding to, for example, the application computing systems 108.

Figure 2:
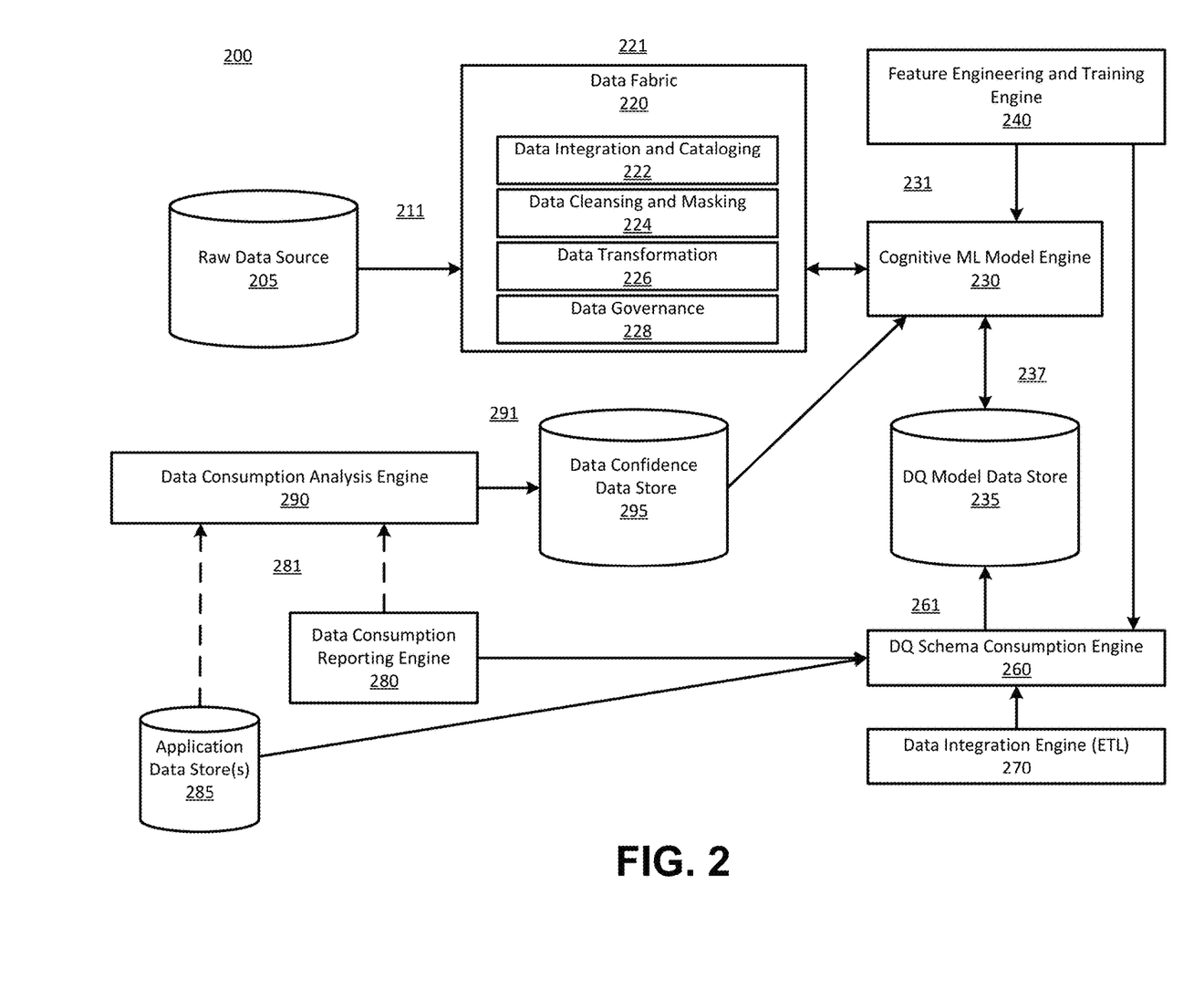
FIG. 2 shows an illustrative inline data schema management system in accordance with one or more aspects described herein.

FIG. 2 shows an illustrative inline data schema management system 200 in accordance with one or more aspects described herein. The inline data quality schema management system 104 may include a data source 205 (e.g., a source database), a data fabric 220, a cognitive ML model engine 230, a feature engineering and training engine 240, a DQ model data store 235, a DQ schema consumption engine 260, a data integration engine 270, a data consumption reporting engine 280 that may comprise one or more reporting applications, one or more application data stores 285, a data consumption analysis engine 290, and a data confidence data store 295.

The raw data source 205 may include one or more sources of data for use by one or more applications on the enterprise network, such as the application computing systems 108. The raw data source 205 may include a relational database, a noSQL database, a spreadsheet, a text file, and/or other data storage format. At 211, the data fabric 220 may import raw data from the raw data source 205 and, at 221, process the raw data via one or more data processing algorithms. The data fabric is a network-based architecture that facilitates data integration into a network environment via data pipelines to enable algorithms for analytics, insight generation, orchestration, and application of the data. Often, the data fabric 220 may be used to provide a layer of abstraction over underlying data components, such as via metadata, to make information and insights available to business users without duplication or mandatory data science efforts. The data fabric 220 may be a single, unified architecture with an integrated set of technologies and services, designed to deliver integrated and enriched data at the right time using right method. It may be used to build intelligent data integration and data pipelining solutions by connecting data of different forms coming from multiple sources. An advantage of using the data fabric 220 is that it allows maximized use of data values and accelerates digital transformation The data fabric 220 may include a data integration and cataloging module 222, a data cleansing and masking module 224, a data transformation module 226, and a data governance module 228, and the like. Each module may be used for importing and formatting data for use within the network and may utilize one or more data quality models to format raw data for use by the one or more applications 108. The cognitive ML model engine may process one or more DQ models within the datastore to ensure data quality of the raw data set before importing the raw data into the application data store(s) 285 such as by generating different data quality rules from raw data and/or feedback from existing system data use and DQ models.

The data integration and cataloging module 222 receives raw data from the one or more data sources and processes the input data to catalog the data to identify one or more application systems associated with the data. In some cases, the raw input data may include an indication of an associated application computing system. In some cases, the raw input data may be cataloged based on a data type and/or metadata associated with the raw information. In some cases, the raw input data may be cataloged to reflect a security level associated with the data, such as public information, private information, secret information and the like. Additionally, or alternatively, the raw information may be cataloged to reflect whether the information is associated with an individual (e.g., address information, personal identification information, financial information, and the like), an activity (e.g., a purchase recordation, a deposit activity, and the like), a request (e.g., a transaction request, an application, and the like, an object (e.g., a residence, a vehicle, a business, and the like) and/or the like. The data cleansing and masking module 224 may analyze the imported and/or cataloged data to identify personally identifiable information and/or other private or non-public information. The identified personally identifiable information and/or other private or non-public information may be processed in applications for masking and/or unmasking data and cleansing operations performed on raw data such as to remove duplicates, corrupt information, and/or inaccurate data. Based on the analysis, the data cleansing and masking module 224 may cleanse, mask, or otherwise obfuscate personal, private, and/or secure information to ensure data security and/or data integrity. The data cleansing and masking module 224 may process business rules and/or may operate based on regulations to maintain a proper level of security based on a category associated with the data. For example, the data cleansing and masking module 224 may mask or otherwise obfuscate a personal identification number, an account number, and/or the like to maintain data security over the obfuscated information. In some cases, the data cleansing and masking module 224 may identify irrelevant information based on a category associated with the processed data where account information or personally identifiable information may be removed from the data set.

The data transformation module 226 may process instructions to transform data based on one or more rules and/or a category associated with the data. For example, raw input data may be transformed from a first data type associated with the raw data to a second data type associated with one or more target application data repositories. For example, the data transformation module 226 may transform a numerical data record from a first numerical data type (e.g., integer) to a second numerical data type (e.g., floating point). Other data types that may be utilized with the transformations may include textual data type, string data types combining data types, splitting raw data elements into two or more data elements, combining portions of different data elements into a combined data element, translation or otherwise mapping of data, generalizing of lower level data types into higher level categorizations, integration of data into different data sets or categorizations, discretization of data sets, manipulating data, and the like. In some cases, the data transformation module 226 may transform raw data and/or associated metadata to generate (or remove) metadata from processed data records. The data governance module 228, may process the incoming based on one or more internal policies or standards associated with how data is gathered, stored, processed, and disposed for each of a plurality of data repositories for the enterprise network. In some cases, the data governance module 228 may apply data quality rules incorporated in the data quality models to ensure proper data quality across the enterprise network and all associated application data repositories.

In some cases, multiple applications may use same or similar data. These applications may change or be modified over time. Additionally, technology bases or frameworks utilized by the applications may change over time. New applications may be added to the enterprise network, and older applications may be decommissioned. As such, the DQ models may be required to be continuously trained and/or otherwise modified over time, such as by the feature engineering and training engine 240, at 231. At 237, the trained models may be stored in the DQ model data store 235. The DQ model may be an end product containing different data quality rules for each data element from a particular dataset. In some cases, the DQ model may incorporate one or more data query languages and associated semantics as part of the model. For example, the DQ model may include SQL language commands, statements and/or other characteristics and semantics associated with a particular data repository type and/or category of data repositories. In some cases, the DQ model may include data query language and/or syntax combinations that may be used to organize or otherwise format data based on one or more data quality rules. This data quality model can be utilized in multiple destination applications to ensure consistent data quality and accuracy of data elements in the data across the enterprise network. The data quality model may be defined as standard and/or proprietary formats to be used across business or organization and hence providing single location of data quality rule for data element. Illustrative data quality metadata for different data elements (e.g., a party name data element, a tax identifier data element) and the like. Each DQ model may include one or more data elements used by a particular application of set of applications that share same or similar data. The data element metadata, as seen in FIG. 3, may include a data element identifier, a domain of use for the data element (e.g., client data), and one or more data quality rules to be applied to data associated with a particular data element.

The cognitive ML model engine 230 may process one or more cognitive ML algorithms using a deep learning and/or a neural network technique to identify DQ metadata rules from different datasets (e.g., raw data sets, application data sets, and the like) by identifying relevance, relations, data domain of data fields and identifying different patterns of data, and in some cases, regardless of a data format. The algorithm may be based on cognitive computing to generate data patterns and intelligence similar to human reasoning and process data with a trained understanding of data for business domains across the enterprise. The cognitive ML model engine 230 may synthesize data quality rules while weighing context of data values by identifying data groups based on relevance and semantics of data to generate multiple data value patterns. For example, as seen in FIG. 4, an illustrative neuron 400 may be used as part of an intelligent algorithm to generate DQ rules for the DQ models by performing multiple stages of evaluation for each neuron type. Neuron types may include atomic value(s), ranges, groups, overall domains, relevance factors, relationships to other fields, and the like. The illustrative neuron 400 may process a plurality of inputs (e.g., $x_1$, $x_2$, $x_3$, and the like) to determine a weighted sum of the inputs (e.g., $w_1*x_1$, $w_2*x_2$, $w_3*x_3$, and the like) to be used as an input to an activation function (f) to produce the output (y).

As part of the training process by the feature engineering and training engine 240, weights, activation functions, and groupings of inputs may evolve over time, based on feedback received from the system. The feedback may be provided by the data schema consumption engine 260 and data confidence feedback from the data confidence data store 295. Each DQ model stored in the DQ model datastore 235 may be associated with a particular application or set of applications using at least a same partial data set. The DQ schema consumption engine 260, at 261, may provide DQ rules to be used by a data integration engine utilizing ETL functionality to use one or more sets of business rules to clean and organize raw data and prepare it for storage, data analytics, and machine learning (ML). Similarly, the DQ schema consumption engine 260 may provide DQ rules to be used by the application data stores 285 and/or to provide data consumption reports, alerts, and/or other feedback from the data consumption reporting engine 280 to provide data accuracy validations. At 281, the application data store 285 (metadata, usage data, error data, and the like) and/or reporting may utilize the data consumption reporting engine 280 to retrieve DQ confidence information from the DQ confidence data store 295. The data confidence information may provide confidence information regarding the data quality of the stored data, such as a confidence score regarding data accuracy information, data format information, data quality rule effectiveness, and/or the like.

Figure 3:
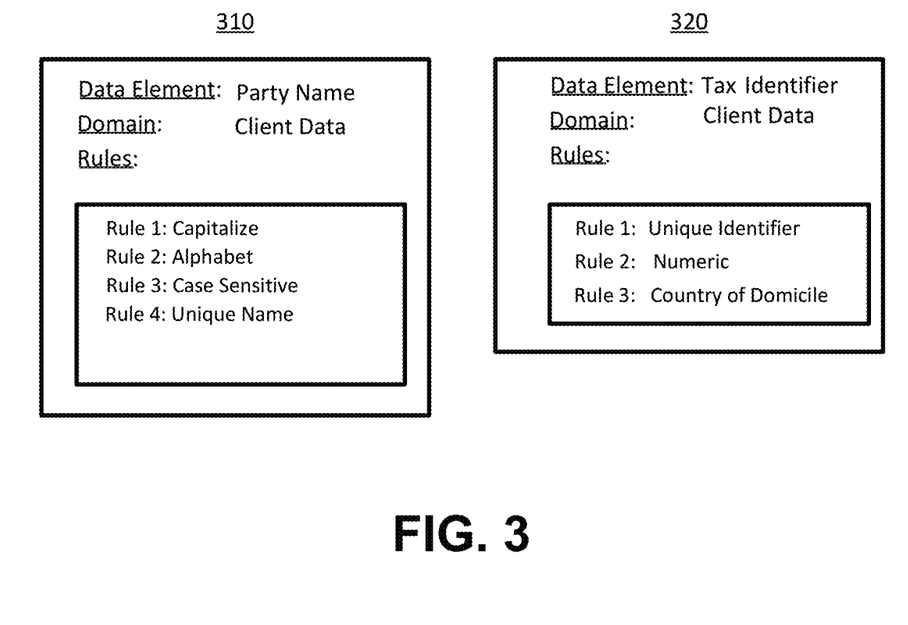
FIG. 3 shows an illustrative examples of data schema rules generated by the inline data schema management system in accordance with one or more aspects described herein.
Figure 4:
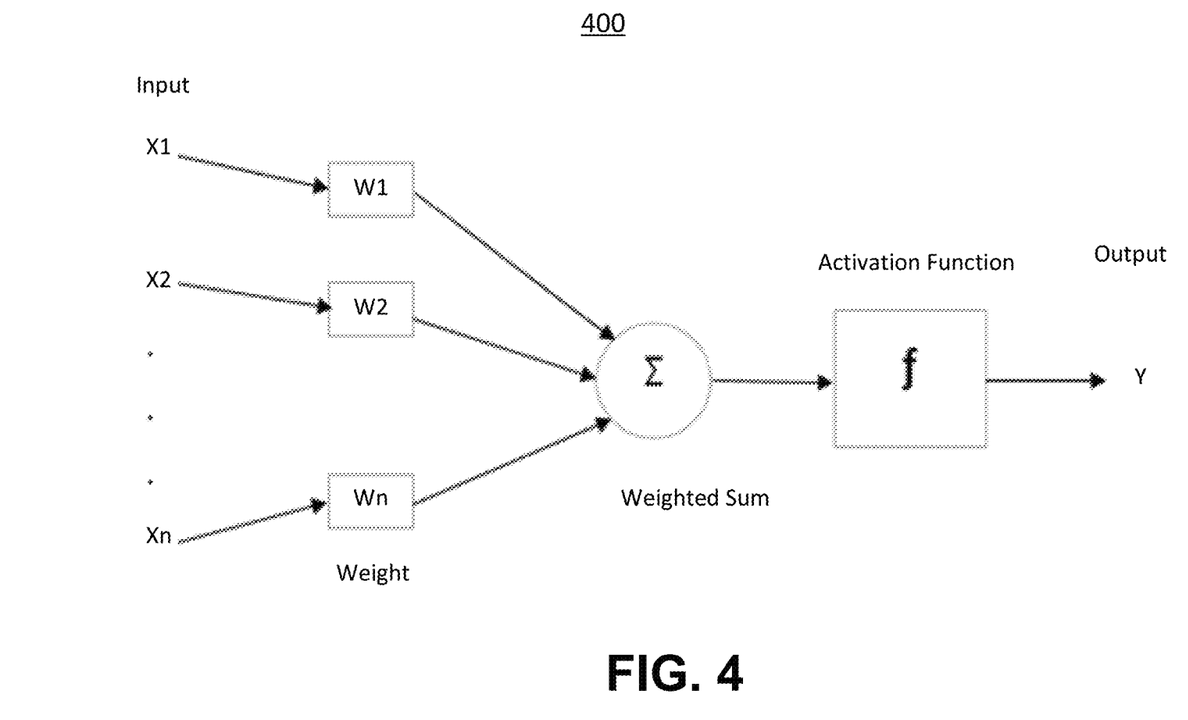
FIG. 4 shows an illustrative neuron used for an artificial intelligence/machine learning algorithm in accordance with one or more aspects described herein.

FIG. 3 shows an illustrative examples of data schema rules generated by the inline data schema management system in accordance with one or more aspects described herein. For example, data element 310 shows an illustrative data element associated with party name data types and is associated with a client data domain. Rules that have been identified and associated with the data element 310 for at least one data model includes rules to ensure capitalization of at least certain characters within a party name, use of alphabetical characters, case sensitivity, and uniqueness for the name. Similarly, a data element 320 shows an illustrative data element associated with a tax identifier data types and is associated with a client data domain. Rules that have been identified and associated with the data element 320 for at least one data model includes rules to ensure uniqueness of the tax identifier (e.g., within a data set, within an associated geographic region, and the like), use of numeric characters, and a country of domicile for an associated party.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

The invention claimed is:

1. A system comprising:
an application computing system comprising a data repository; and
a computing device comprising:
at least one processor; and
non-transitory memory storing computer-readable instructions that, when executed by the at least one processor, cause the computing device to:
process a first raw data set received from a data source to generate processed data;
remove irrelevant information based on a category associated with the processed data and personally identifiable information, wherein the irrelevant information is removed from the data set;
identify, by a neural network, data quality rules from the processed data, wherein the data quality rules correspond to schemas across disparate database technologies and are automatically inferred based on data of data elements in the processed data and an identified significance of data in data points associated with extraction of common characteristics of data;
generate, by the neural network and based on multiple destination applications, a data quality rules model based on the processed data, wherein the data quality rules model ensures consistent data quality and accuracy of data elements for data sets used across the multiple destination applications and wherein each data element type of a plurality of data element types is associated with corresponding data quality metadata comprising a unique data quality ruleset;
import, from the data source, a second raw data set;
add, as data quality metadata for a first data schema for a particular relational database management system and for a second data quality schema for a noSQL databases, the data quality rules; and
train, based on feedback received from the application computing system and by the neural network, the data quality rules model, wherein the feedback comprises data quality rule effectiveness information.

2. The system of claim 1, wherein the instructions cause the computing device to process, within a data fabric, the first raw data set to generate the processed data set, wherein the processed data comprises the processed data and associated metadata.

3. The system of claim 2, wherein the instructions cause the computing device to process, within a data fabric, the first raw data set to generate the processed data set comprises cataloging each data element of the first raw data set.

4. The system of claim 2, wherein the instructions cause the computing device to process, within a data fabric, the first raw data set to generate the processed data set comprises masking non-public information for each data element of the first raw data set.

5. The system of claim 2, wherein the instructions cause the computing device to process, within a data fabric, the first raw data set to generate the processed data set comprises transforming a first data element from a source data type to a target data type, wherein the target data type is associated with the data repository.

6. The system of claim 2, wherein the instructions cause the computing device to:
process, within a data fabric, the first raw data set to generate the processed data set comprises applying at least one data quality model to the first raw data set; and
synthesize data quality rules, comprising multiple generated data value patterns, while weighing context of data values by identifying data groups based on relevance and semantics of the processed data.

7. The system of claim 1, wherein the instructions cause the computing device to:
retrieve, from a data confidence data store, data consumption information associated with data usage reports from the application computing system; and
train, a data quality model based on the data consumption information, wherein the data consumption information corresponds to data accuracy information and data quality rule effectiveness information.

8. A method comprising:
processing, a first raw data set received from a data source, to generate processed data;
removing irrelevant information based on a category associated with the processed data and personally identifiable information, wherein the irrelevant information is removed from the data set;
identifying, by a neural network, data quality rules from the processed data, wherein the data quality rules correspond to schemas across disparate database technologies and are automatically inferred based on data of data elements in the processed data and an identified significance of data in data points associated with extraction of common characteristics of the processed data;
generating, by the neural network and based on multiple destination applications, a data quality rules model based on the processed data, wherein the data quality rules model ensures consistent data quality and accuracy of data elements for data sets used across the multiple destination applications and wherein each data element type of a plurality of data element types is associated with corresponding data quality metadata comprising a unique data quality ruleset;
importing, from the data source, a second raw data set;
adding, as data quality metadata for a data schema for each particular relational database management system and each noSQL database, the data quality rules; and
training, based on feedback received from an application computing system and by the neural network, the data quality rules model, wherein the feedback comprises data quality rule effectiveness information.

9. The method of claim 8, further comprising generating the processed data set, wherein the processed data comprises the processed data and associated metadata.

10. The method of claim 9, further comprising cataloging each data element of the first raw data set.

11. The method of claim 9, further comprising masking non-public information for each data element of the first raw data set.

12. The method of claim 9, further comprising transforming a first data element from a source data type to a target data type, wherein the target data type is associated with a data repository.

13. The method of claim 9, further comprising applying at least one data quality model to the first raw data set.

14. The method of claim 9, further comprising:
retrieving, from a data confidence data store, data consumption information associated with data usage reports from an application computing system; and training, a data quality model based on the data consumption information.

15. A computing device comprising:
at least one processor; and
non-transitory memory storing computer-readable instructions that, when executed by the at least one processor, cause the computing device to:
process, a first raw data set received from a data source, to generate processed data;
remove irrelevant information based on a category associated with the processed data and personally identifiable information, wherein the irrelevant information is removed from the data set;
identify, by a neural network, data quality rules from the processed data, wherein the data quality rules correspond to schemas across disparate database technologies and are automatically inferred based on data of data elements in the processed data and an identified significance of data in data points associated with extraction of common characteristics of the processed data;
generate, by the neural network and based on multiple destination applications, a data quality rules model based on the processed data, wherein the data quality rules model ensures consistent data quality and accuracy of data elements for data sets used across the multiple destination applications and wherein each data element type of a plurality of data element types is associated with corresponding data quality metadata comprising a unique data quality ruleset;
import, from the data source, a second raw data set;
add, as data quality metadata for a data schema for each particular relational database management system and each noSQL database, the data quality rules; and
train, based on feedback received from an application computing system and by the neural network, the data quality rules model, wherein the feedback comprises data quality rule effectiveness information.

16. The computing device of claim 15, wherein the instructions cause the computing device to process, within a data fabric, the first raw data set to generate the processed data set, wherein the processed data comprises the processed data and associated metadata.

17. The computing device of claim 16, wherein the instructions cause the computing device to process, within a data fabric, the first raw data set to generate the processed data set comprises cataloging each data element of the first raw data set.

18. The computing device of claim 16, wherein the instructions cause the computing device to process, within a data fabric, the first raw data set to generate the processed data set comprises masking non-public information for each data element of the first raw data set.

19. The computing device of claim 16, wherein the instructions cause the computing device to process, within a data fabric, the first raw data set to generate the processed data set comprises transforming a first data element from a source data type to a target data type, wherein the target data type is associated with a data repository.

20. The computing device of claim 15, wherein the instructions cause the computing device to:
retrieve, from a data confidence data store, data consumption information associated with data usage reports from the application computing system; and
train, a data quality model based on the data consumption information.

* * * * *